(12) United States Patent
Callanan et al.

(10) Patent No.: US 9,106,450 B2
(45) Date of Patent: Aug. 11, 2015

(54) SYSTEM AND METHOD FOR COMMUNICATION MANAGEMENT

(75) Inventors: Sean Callanan, Dublin (IE); Gary Denner, Kildare (IE); Patrick Joseph O'Sullivan, Dublin (IE); Al Chakra, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1206 days.

(21) Appl. No.: 11/933,651

(22) Filed: Nov. 1, 2007

(65) Prior Publication Data

US 2009/0116403 A1 May 7, 2009

(51) Int. Cl.
*H04L 12/58* (2006.01)
*H04L 12/70* (2013.01)
*H04L 29/08* (2006.01)

(52) U.S. Cl.
CPC ............ *H04L 12/5855* (2013.01); *H04L 51/14* (2013.01); *H04L 67/24* (2013.01); *H04L 67/306* (2013.01)

(58) Field of Classification Search
USPC .................. 370/259; 455/414.1; 379/201.02; 709/205, 204, 206, 207
See application file for complete search history.

(56) References Cited

U.S. PATENT DOCUMENTS

| | | | | |
|---|---|---|---|---|
| 7,251,252 B2 * | 7/2007 | Norby | | 370/466 |
| 8,781,081 B2 * | 7/2014 | Walter | | 379/88.14 |
| 2002/0069249 A1 * | 6/2002 | Pedersen | | 709/204 |
| 2002/0085701 A1 * | 7/2002 | Parsons et al. | | 379/211.01 |
| 2002/0118807 A1 * | 8/2002 | Pedersen | | 379/142.01 |
| 2004/0267887 A1 * | 12/2004 | Berger et al. | | 709/206 |
| 2005/0125498 A1 * | 6/2005 | Frank et al. | | 709/206 |
| 2005/0148351 A1 | 7/2005 | Reding et al. | | |
| 2005/0195802 A1 * | 9/2005 | Klein et al. | | 370/352 |
| 2005/0201362 A1 * | 9/2005 | Klein et al. | | 370/352 |
| 2005/0210104 A1 * | 9/2005 | Torvinen | | 709/205 |
| 2005/0245274 A1 * | 11/2005 | Oishi et al. | | 455/456.5 |
| 2006/0072726 A1 * | 4/2006 | Klein et al. | | 379/201.01 |
| 2006/0093117 A1 | 5/2006 | Agrawal et al. | | |

(Continued)

FOREIGN PATENT DOCUMENTS

| | | |
|---|---|---|
| WO | 2004049679 A1 | 6/2004 |
| WO | 2005020546 | 3/2005 |

OTHER PUBLICATIONS http://www.gordano.com/Products/IM, "GMS Instant Messenger," pp. 1, Nov. 8, 2013.

(Continued)

*Primary Examiner* — Ayaz Sheikh
*Assistant Examiner* — Tarell Hampton
(74) *Attorney, Agent, or Firm* — Holland & Knight LLP; Brian J. Colandreo, Esq.; Jeffrey T. Placker, Esq.

(57) ABSTRACT

A method and computer program product for managing communications with a user include defining one or more communication profiles for a user, in which defining the one or more communication profiles includes defining one or more communication channels for the user, and defining a preferred communication schedule for each of the one or more communication channels. The preferred communication schedule is associated with a respective one of the one or more communication channels. Communications with the user by a contacting user are managed based upon, at least in part, the one or more communication profiles for the user.

20 Claims, 9 Drawing Sheets

(56) References Cited

U.S. PATENT DOCUMENTS

2006/0183460 A1* 8/2006 Srinivasan et al. ............ 455/410
2006/0285652 A1* 12/2006 McClelland et al. ........... 379/52
2008/0119165 A1* 5/2008 Mittal et al. .................. 455/411
2008/0215961 A1* 9/2008 Altberg et al. ................ 715/205
2009/0041222 A1* 2/2009 Guven .................... 379/210.02

OTHER PUBLICATIONS http://www.carahsoft.com/jabber/developer.php, "Jabber Solutions for Government From Carahsoft," pp. 1-2, Nov. 8, 2012.

* cited by examiner

SYSTEM AND METHOD FOR COMMUNICATION MANAGEMENT

TECHNICAL FIELD

This disclosure relates to communication management and, more particularly, to systems and methods for managing communication across multiple communication technologies.

BACKGROUND

Email, instant messaging, text messaging, as well as other communications systems that exist today have converged to leave consumers of the technologies with less control of when and how they are communicated with. One person attempting to contact another has the ability to initiate communications through phone, voice over IP, instant message, short message service (SMS, i.e., text messaging), email etc. The mode of communication is at the option of the person initiating the communication. As such, the person initiating the communication has the ability to utilize his preferred method of communication.

While a person initiating a communication has the ability to choose the device to be used for the communication, the selected communication device may not be the receiver's preferred means of communication. For example, one person may prefer to conduct communication via email and may, therefore, send an email to a recipient. The recipient may, by contrast, find email to be inconvenient, often requiring a protracted exchange of multiple emails to conclude a relatively simple matter. The recipient may prefer to use voice communication, such as the telephone, so that the matter can be quickly and fully addressed in a single exchange. While the recipient can tell others that he wishes to be contacted by telephone, the ultimate decision of how the communication will be carried out is up to the person initiating the communication.

Being on the receiving end of so many communication devices, may leave a person with very little control over how people contact him. So if he prefers to conduct most communications via voice or email and prefers that instant messages should only be used for casual communications he is not able to express this to all the people who wish to contact him. Furthermore, even for those people that he has informed of his preference, a person receiving a communication has no way to force others to honor his preferred methods of communication. The situation may be further complicated in that the person's preferred means of communication may differ throughout the week, at different times of the day, and even for different people.

SUMMARY OF DISCLOSURE

In a first implementation, a method includes defining one or more communication profiles for a user. Defining the one or more communication profiles includes defining one or more communication channels for the user, and defining a preferred communication schedule for each of the one or more communication channels. The preferred communication schedule is associated with a respective one of the one or more communication channels. Communications with the user by a contacting user are managed based upon, at least in part, the one or more communication profiles for the user.

One or more of the following features may be included. Managing communications with the user may include suggesting a recommended communication channel to the contacting user based upon, at least in part, the one or more communication profiles for the user. Managing communications with the user may additionally/alternatively include broadcasting to the contacting user at least a portion of the one or more communication profiles for the user in response to an attempt to contact the user by the contacting user. Broadcasting to the contacting user at least a portion of one or more communication profiles for the user may include providing the preferred schedule to a contacting user. Broadcasting to the contacting user at least a portion of the one or more communication profiles for the user may additionally/alternatively include providing communication details for at least the preferred communication channel.

Managing communications with the user may include enforcing the one or more communication profiles. Enforcing the communications profile may include restricting communications to the user on non-preferred channels. Enforcing the one or more communication profiles may additionally/alternatively include providing one or more exceptions to the one or more communication profiles based upon, at least in part, a predetermined communications policy. The communications policy may provide an exception based upon, at least in part, an organizational hierarchy, or the identity of the contacting user.

The method may further include defining a plurality of communication profiles.

According to another implementation, a computer program product resides on a computer readable medium that has a plurality of instructions stored on it. When executed by a processor, the instructions cause the processor to perform operations including defining one or more communication profiles for a user. The instructions for defining the one or more communication profiles include instructions for defining one or more communication channels for the user, and defining a preferred communication schedule for each of the one or more communication channels. Instructions are included for associating the preferred communication schedule with a respective one of the one or more communication channels. Communications with the user by a contacting user are managed based upon, at least in part, the one or more communication profiles for the user.

One or more of the following features may be included. The instructions for managing communications with the user may include instructions for suggesting a recommended communication channel to the contacting user based upon, at least in part, the one or more communication profiles for the user. The instructions for managing communications with the user may include instructions for broadcasting to the contacting user at least a portion of the one or more communication profiles for the user in response to an attempt to contact the user by the contacting user. The instructions for broadcasting to the contacting user at least a portion of the one or more communication profiles for the user may include instructions for providing the preferred schedule to a contacting user. The instructions for broadcasting to the contacting user at least a portion of the one or more communication profiles for the user may include instructions for providing communication details for at least the preferred communication channel.

The instructions for managing communications with the user may include instructions for enforcing the one or more communication profile. The instructions for enforcing the communications profile may include instructions for restricting communications to the user on non-preferred channels. The instructions for enforcing the one or more communication profiles may include instructions for providing one or more exceptions to the one or more communication profiles based upon, at least in part, a predetermined communications policy. The communications policy provides an exception based upon, at least in part, an organizational hierarchy, or the identity of the contacting user.

The computer program product may further include instructions for defining a plurality of communication profiles.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Figure 1:
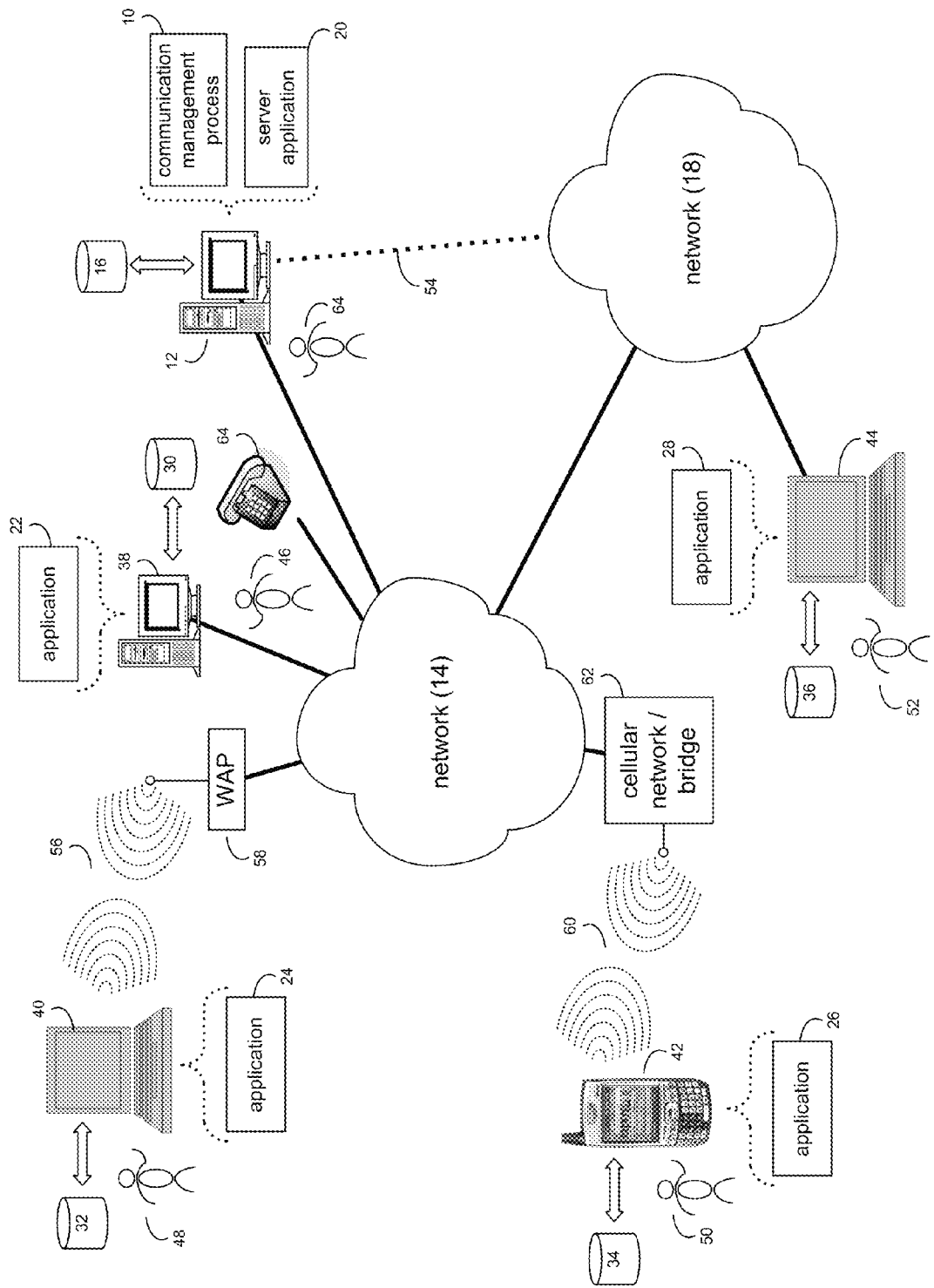
FIG. 1 is a diagrammatic view of a communication management process and email application coupled to a distributed computing network.

System Overview:

Referring to FIG. 1, there is shown communication management process 10 that may reside on and may be executed by server computer 12, which may be connected to network 14 (e.g., the Internet, a local area network, or telephone system). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Alternatively, communication management process 10 may reside on and be executed, in whole or in part, by a client electronic device, such as a personal computer, notebook computer, personal digital assistant, or the like.

As will be discussed below in greater detail, communication management process 10 may allow a user to define one or more communication profiles. Defining the one or more communication profiles may include defining one or more communication channels for the user, and defining a preferred communication schedule for each of the one or more communication channels. The preferred communication schedule may be associated with a respective one of the one or more communication channels. Communications with the user by a contacting user are managed based upon, at least in part, the one or more communication profiles for the user.

The instruction sets and subroutines of communication management process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more communication server applications, e.g., server application 20. Examples of server application 20 may include, but are not limited to, email server applications (e.g., Lotus Domino™ Server and Microsoft Exchange™ Server), instant messaging server applications (e.g., IBM Lotus Sametime™, Microsoft Office Live Communications Server™, Jabber XCP™, and AOL Instant Messenger™), voice over IP server applications or PBX telephone systems, SMS (short message service) applications (i.e., text messaging applications). Server application 20 may interact with client applications 22, 24, 26, 28, examples of which may include, but are not limited to, email client applications (e.g., Lotus Notes™ and Microsoft Outlook™), instant messaging client applications (e.g., AOL Instant Messenger™, IBM Lotus Sametime™, Google Talk™), voice over IP client applications, softphone applications, and SMS applications. Communication management process 10 may be a stand alone application that interfaces with server application 20 or an applet/application that is executed within server application 20. Additionally, while not shown, server application 20 and communication management process 10 may reside on different servers coupled to network 14, 18. Similarly, various applications of the one or more server applications (of which server application 20 is an example) may reside on different servers coupled to network 14, 18.

The instruction sets and subroutines of server application 20, which may be stored on storage device 16 coupled to server computer 12 may be executed by one or more processors (not shown) and one or more memory architectures (not shown) incorporated into server computer 12.

As mentioned above, in addition/as an alternative to being a server-based application residing on server computer 12, the communication management process may be a client-side application (not shown) residing on a storage device (e.g., stored on storage device 30, 32, 34, 36) coupled to one or more client electronic device (e.g., client electronic devices 38, 40, 42, 44 respectively). As such, the communication management process may be a stand alone application that interfaces with a client application (e.g., client applications 22, 24, 26, 28) and/or a server application (e.g., server application 20), or may be an applet/application that is executed within a client application. As such, the communication management process may be a client-side process, a server-side process, or a hybrid client-side/server-side process, which may be executed, in whole or in part, by server computer 12, or one or more of client electronic device 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using applications 22, 24, 26, 28, users 46, 48, 50, 52 may, for example, access server application 20 and may, e.g., conduct email communications, conduct instant messaging communications, conduct voice communications, and the like.

Users 46, 48, 50, 52 may access server application 20 directly through the device on which the client application (e.g., applications 22, 24, 26, 28) is executed, namely client electronic devices 38, 40, 42, 44, or through a telephone (e.g., telephone 64, in a case in which server application 20 includes a voice application, e.g., PBX, voice over IP, etc., application), for example. Users 46, 48, 50, 52 may access server application 20 directly through network 14 or through secondary network 18. Further, server computer 12 (i.e., the computer that server application 20) may be connected to network 14 through secondary network 18, as illustrated with phantom link line 54.

The various client electronic devices may be directly or indirectly coupled to network 14 (or network 18). For example, personal computer 38 and telephone 64 are shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

Figure 2:
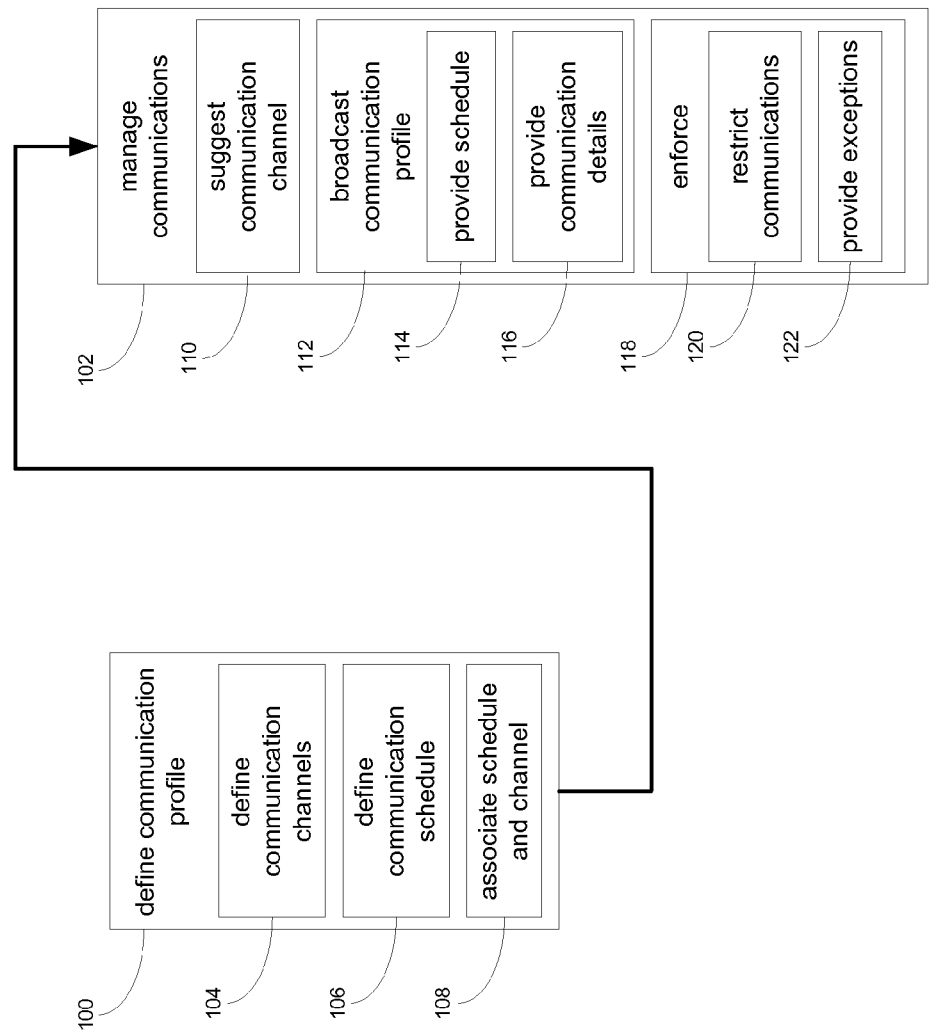
FIG. 2 is a flowchart of a process executed by the communication management process of FIG. 1.

The Communication Management Process:

Referring also to FIG. 2, communication management process 10 may allow a user to define 100 one or more communication profiles for the user. Communication management process may manage 102 communications with the user by a contacting user based upon, at least in part, the one or more communication profiles for the user. The user may be allowed to define 100 the one or more communication profiles including defining 104 one or more communication channels. Additionally, communication management process 10 may allow the user to define 106 a preferred communication schedule for each of the one or more communication channels. Communication management process 10 may associate 108 the preferred communication schedule for each communication channel with the respective communication channel. The one or more communication channels may include any and all modes of communication between a user and a contacting user. Examples of communication channels may include, but are not limited to, email, voice (e.g., voice over IP, standard telephone service, mobile phone), instant messaging, and text messaging (short message service, or SMS).

Figure 3:
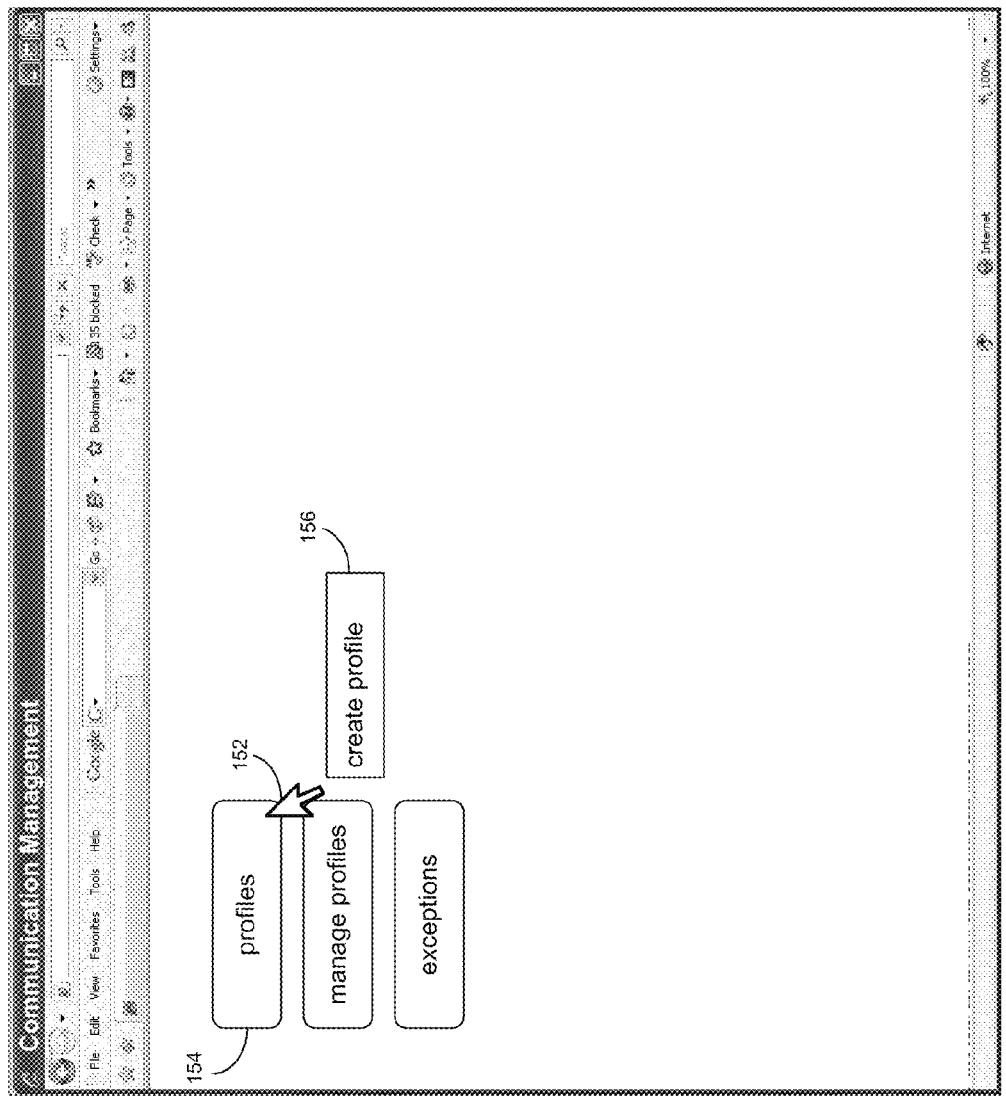
FIG. 3 is a diagrammatic view of a display screen rendered by the communication management process of FIG. 1.

Continuing with the above-stated example, and referring also to FIG. 3, communication management process 10 may allow user 46 to define 100 one or more communication profiles, e.g., through user interface 150. For example, user 46 may select, via on-screen pointer 152 (which is controlled by a pointing device such as a mouse; not shown) "profiles" button 154. Upon selecting "profiles" button 154, communication management process 10 may render pop-up window 156. While pop-up window 156 is shown including only one option, namely "create profile", this is for illustrative purposes only and is not intended to be a limitation of this disclosure, as the number of options included within pop-up window 156 may be increased or decreased depending upon design criteria and user need.

Figure 4:
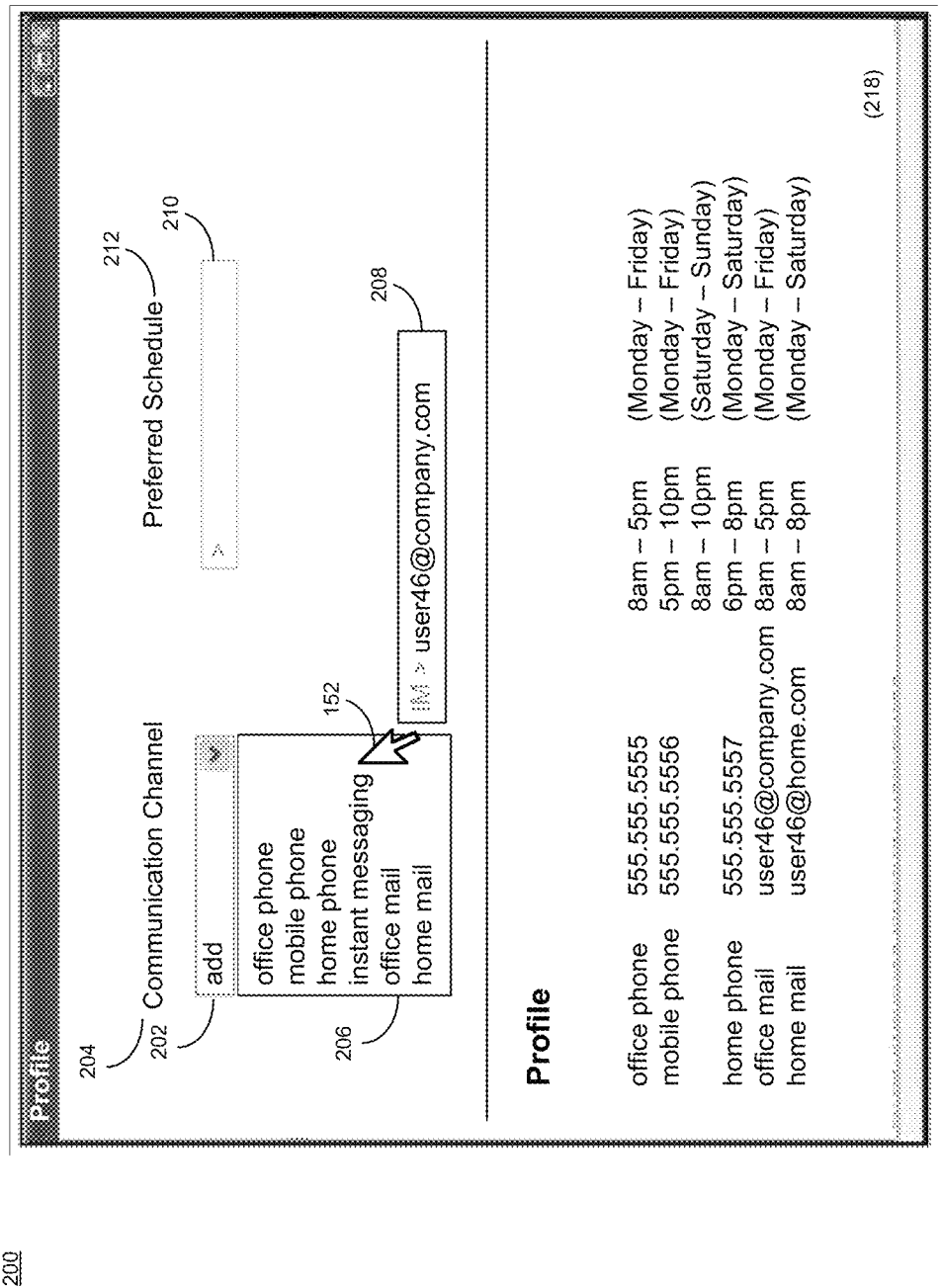
FIG. 4 is a diagrammatic view of a display screen rendered by the communication management process of FIG. 1.

Referring also to FIG. 4, upon selecting "create profile" from pop-up window 156, communication management process 10 may render profile window 200. Using profile window 200, communication management process 10 may allow user 46 to define one or more communication channels. For example, user 46 may select "add" menu 202 using on-screen pointer 152, under "communication channel" option 204 to add a communication channel to a communication profile for user 46. Selecting "add" menu 202 may result in communication management process 10 rendering dropdown menu 206, including a listing of one or more communication channels. For example, dropdown menu 206 may include "office phone", "mobile phone", "home phone", "instant messaging", "office mail", and "home mail" as available communication channels that may be added to the communication profile. Various other communication channels may also be included, e.g., based upon design criteria and user preferences.

Continuing with the above stated example, user 46 may select "instant messaging" from dropdown menu 206, e.g., to define instant messaging as a communication channel included in the communication profile. Selecting "instant messaging" in dropdown menu 206, e.g., using on-screen pointer 152, may result in communication management process 10 rendering address pop-up 208. User 46 may enter contact details (e.g., instant messaging address) for instant messaging communications in address pop-up 208, e.g., using a keyboard (not shown) associated with client electronic device 38.

Figure 5:
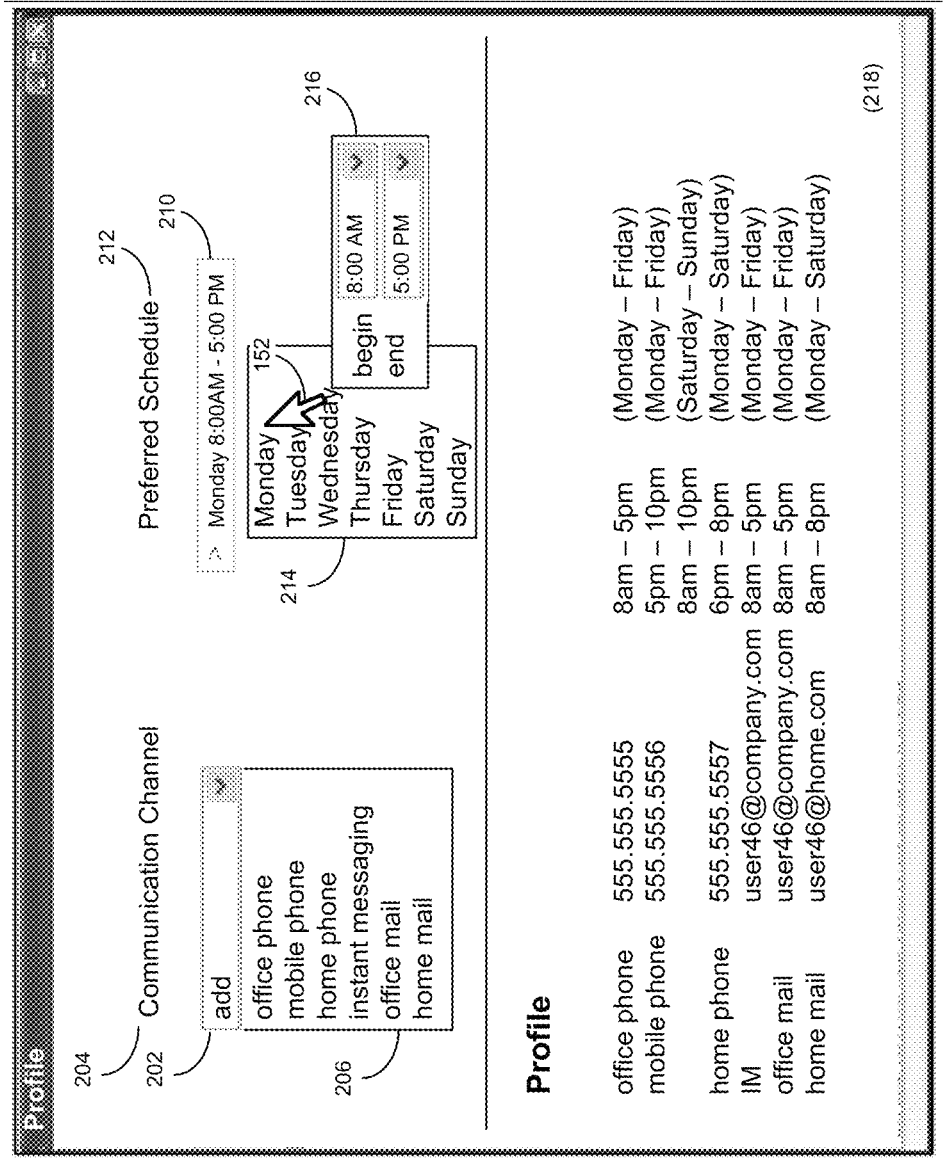
FIG. 5 is a diagrammatic view of a display screen rendered by the communication management process of FIG. 1.

Referring also to FIG. 5, and continuing with the above stated example, communication management process 10 may also allow user 46 to define a preferred schedule for instant messaging communications. For example, user 46 may select, via on-screen pointer 152, schedule box 210 under "Preferred Schedule" option 212 in profile window 200. Selecting schedule box 210 may result in communication management process 10 rendering day menu 214, which may include a listing of the days of the week. Communication management process 10 may allow user 46 to select, e.g., using on-screen pointer 152, one or more days a week included in a preferred contact schedule for instant messaging contacts. When user 46 selects, via on-screen pointer 152, each desired day of the week included in the preferred contact schedule for instant messaging, communication management process 10 may render timing pop-up 216, allowing user 46 to define begin and end times included in the preferred schedule for instant messaging communication. For example, as shown, user 46 may define Monday, 8:00 am-5:00 pm for instant messaging communications. User 46 may continue to add days and times included in the preferred schedule for instant messaging communications until the preferred schedule for instant messaging communications has been defined.

Communication management process 10 may associate 108 the preferred communication schedule (defined as discussed above) for each communication channel (defined as also discussed above) with the respective communication channel. Communication management process 10 may render defined 100 communication profile 218 in profile window 200. Communication profile 218 may include various communication channels defined 104 by user 46, as well as the preferred schedule defined 106 for each communication channel, and the contact details for each communication channel. The preferred scheduled for each communication channel may be associated 108 with the respective communication channel.

Figure 6:
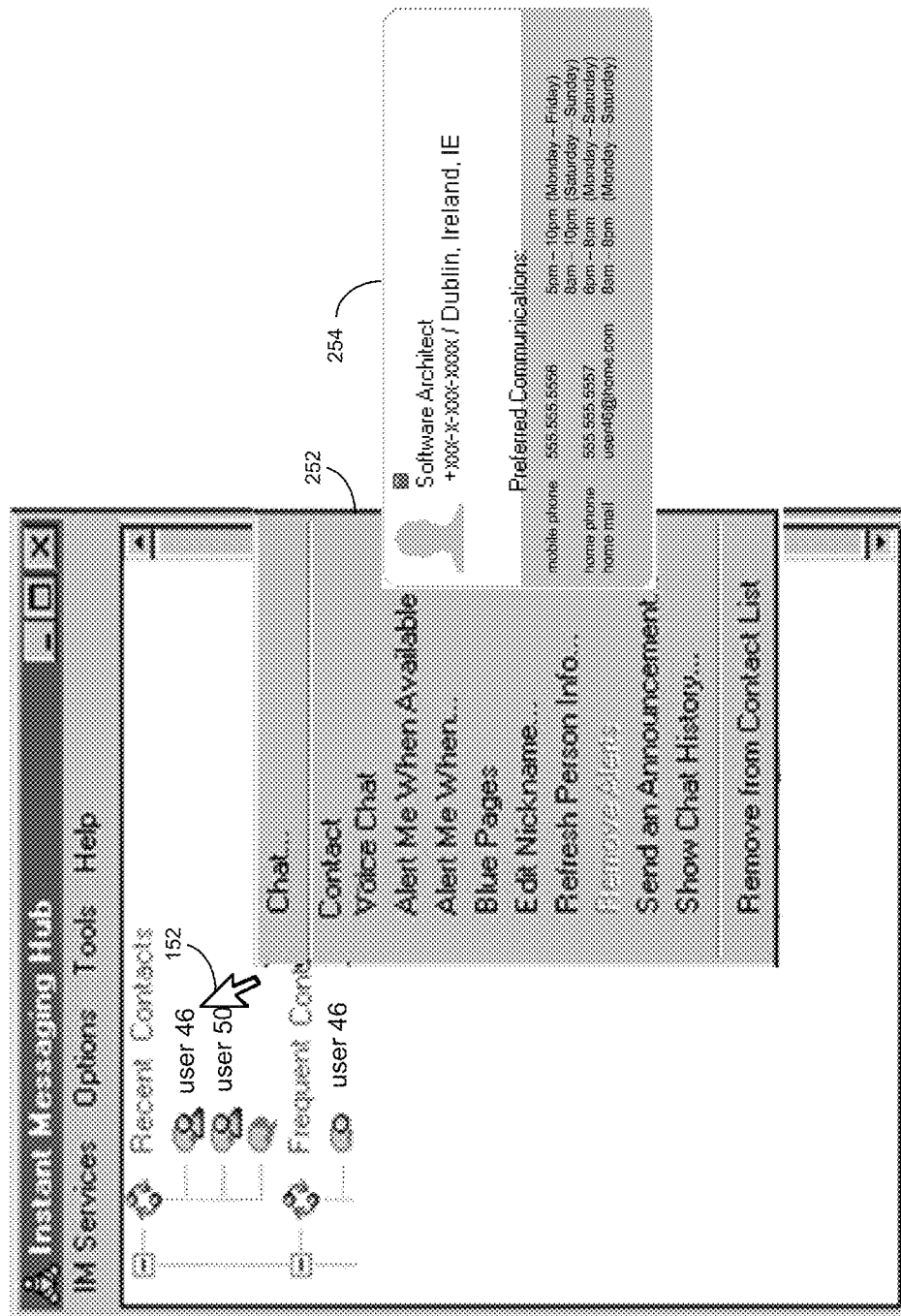
FIG. 6 is a diagrammatic view of a display screen rendered by the communication management process and/or an application of FIG. 1.

Managing 102 communications with the user may include suggesting 110 a recommended communication channel to the contacting user based upon, at least in part, the one or more communication profiles for the user. For example, and referring also to FIG. 6, user 48 may wish to contact user 46 on a Saturday afternoon. However, based upon, at least in part, communication profile 218 defined 100 for user 46 (e.g., as shown in profile window 200 in FIG. 5), instant messaging may not be user 46's preferred communication channel for a Saturday afternoon.

User 48 may attempt to contact user 46 by way of instant messaging, e.g., via instant messaging user interface 250 rendered by application 24. In instant messaging user interface 250 user 48 may select, e.g., using on-screen pointer 152, user 46 from the "Recent Contacts" list rendered in instant messaging user interface. Application 24 may render pop-up menu 252 defining a plurality of options, including "contact". User 48 may select the "contact" option in pop-up menu 252 to attempt to send an instant message to user 46. In response to selecting the "contact" option in pop-up menu 252 communication management process 10 and/or application 24 may render preferred contact window 254. Preferred contact window 254 may suggest 110 a communication channel. Suggesting 110 a communication channel may include displaying one or more recommended communication channels to user 48 based upon, at least in part, user 46's communication profile 218 for the given time and day that contact is being attempted, namely mobile phone, home phone, or home mail (the preferred communication channels for user 46 on Saturday afternoon).

Managing 102 communications with the user may include broadcasting 112 to the contacting user at least a portion of the one or more communication profiles for the user in response to an attempt to contact the user by the contacting user. Broadcasting 112 at least a portion of one or more communication profiles for the user may include one or more of providing 114 the preferred schedule to a contacting user, and providing 116 communication details for at least the preferred communication channel. Continuing with the above-stated example, in addition to including user 46's preferred communication channels for Saturday afternoon (namely, mobile phone, home phone, and home mail), preferred contact window 154 may display, for example, a portion of the communication profile for user 46 that is relevant to the time frame during which contact is being attempted by user 48 (i.e., Saturday afternoon). Displaying the relevant portion of the communication profile may include providing 114 the preferred schedule for the various communication channels (i.e., mobile phone, home phone, and home mail) for Saturday afternoon. Similarly, preferred contact window 154 may provide 116 communication details for the various communication channels (e.g., mobile phone number, home phone number, home mail address). In addition/as an alternative to providing only a portion of the communication schedule and communication details, preferred contact window 154 may display the entire communication profile for user 46.

Figure 7:
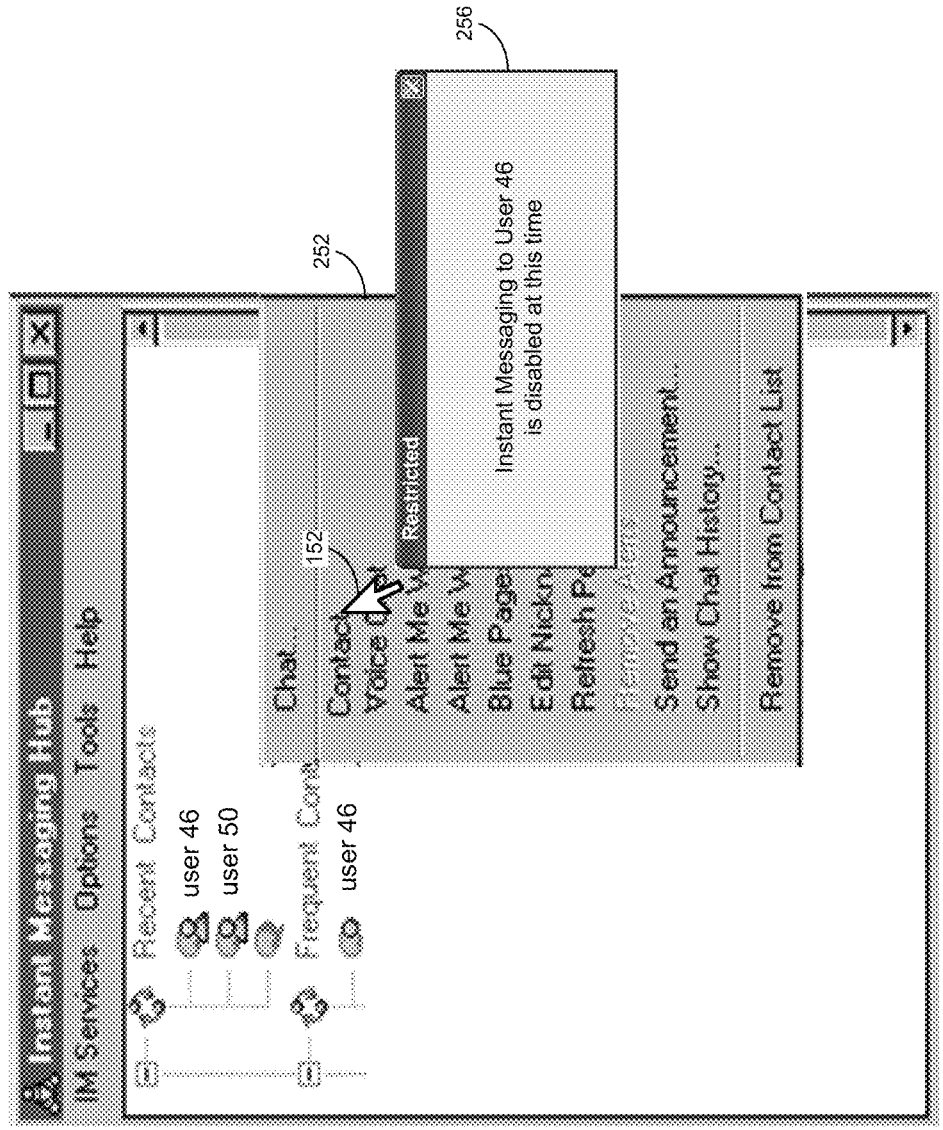
FIG. 7 is a diagrammatic view of a display screen rendered by the communication management process and/or an application of FIG. 1.

In addition/as an alternative to suggesting a communication channel and/or broadcasting at least a portion of the communication profile 218, managing 110 communications with the user may include enforcing 118 the one or more communication profiles. For example, in order to enforce 118 user 46's communication profile, communication management process 10 may restrict 120 communications to user 46 on non-preferred channels. Continuing with the above-stated example, and referring also to FIG. 7, user 48 may continue to attempt to send user 46 an instant message, notwithstanding instant messaging not being one of user 46's preferred communication channels for Saturday afternoon (as indicated by communication profile 218 defined 100 for user 46). For example, user 48 may select, e.g., using on-screen pointer 152, "contact" option of pop-up menu 252, resulting in communication management process 10 and/or application 24 rendering warning dialog box 256. Warning dialog box 256 may include the warning "Instant Messaging to User 46 is disabled at this time." In addition to rendering warning dialog box 256, communication management process 10 and/or application 24 may prevent user 48 from sending an instant message to user 46, e.g., by disabling the contact feature from pop-up menu 252, denying delivery of an instant message including user 46 as a recipient, or other mechanism.

Enforcing 118 the one or more communication profiles may additionally/alternatively include providing 122 one or more exceptions to the one or more communication profiles based upon, at least in part, a predetermined communications policy. In an embodiment in which communication management process 10 may enforce 118 the communication profile of a user, the one or more exceptions may allow a contacting user to contact the user via a non-preferred communication channel. The predetermined communications policy may be a policy set by user 46, may be a system-wide policy for all users, and/or may be a policy set by a third party (e.g., a system administrator) for user 46, a subset of all communications users, and/or all communications users.

Figure 8:
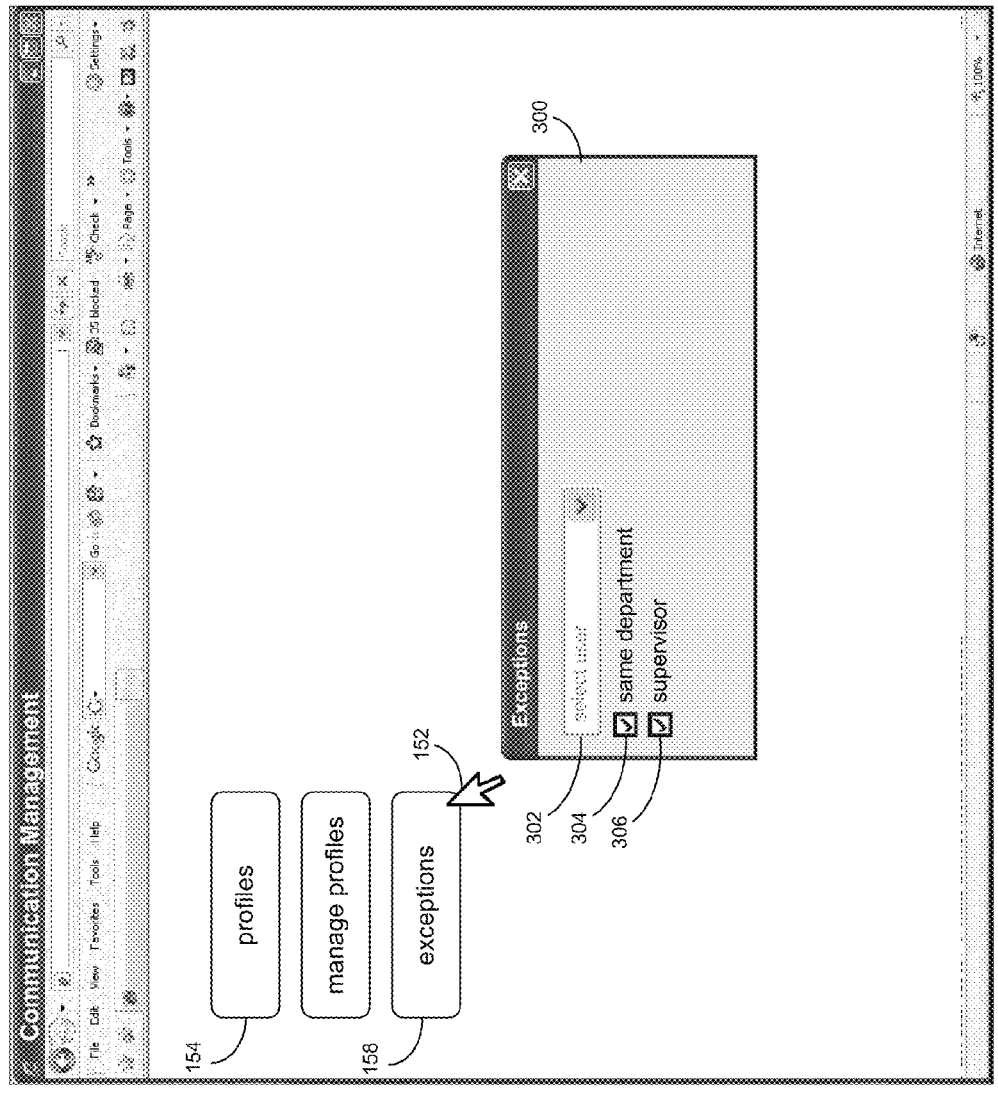
FIG. 8 is a diagrammatic view of a display screen rendered by the communication management process of FIG. 1.

Continuing with the above stated example, and referring also to FIG. 8, communication management process 10 may allow user 46 to set the predetermined communications policy. The predetermined communications policy may allow user 46 to define individual contacting users (e.g., spouse, family members, mentors, and the like) or groups of contacting users for whom the communication policy 218 may not apply (i.e., contacting users that may communicate with user 46 via the contacting user's communication channel of choice). For example, user 46 may select, via on-screen pointer 152, "exceptions" button 158 in user interface 150.

Selecting "exceptions" button 158 may result in communication management process 10 rendering pop-up window 300. Through pop-up window 300, communication management process 10 may allow user 46 to define the predetermined communication policy to include individual users, e.g., via dropdown menu 302.

Additionally/alternatively, communication management process 10 may allow user 46 to define the predetermined communications policy to provide an exception based upon, at least in part, an organizational structure. For example, pop-up window 300 may include "same department" option 304. User 46 may select, e.g., using on-screen pointer 152, "same department" option 304, resulting in communication management process 10 allowing communications from contacting users within the same organizational department as user 46 to communication with user 46 over any communication channel, notwithstanding communication profile 218. Similarly, communication management process 10 may allow user 46 to select, via on-screen pointer 152, "supervisor" option 306, allowing user 46 to be contacted by a supervisor (e.g., designated within an organizational structure) using the supervisor's chosen communication channel. Communication management process 10 may provide various other options and features in providing 122 one or more exceptions to communication profile 218.

Communication management process 10 may additionally allow a user to define 100 a plurality of communication profiles. The various communication profiles may be implemented in connection to different contacting users, for example, a first communication profile may be defined 100 for contacting users within the same department as the user, and a second communication profile may be defined 100 for contacting users in different departments. Similarly, different profiles may be defined 100 for different situations (e.g., working from the office, working from home, out of the office, etc.) The various communication profiles may be defined 100 as discussed above.

Figure 9:
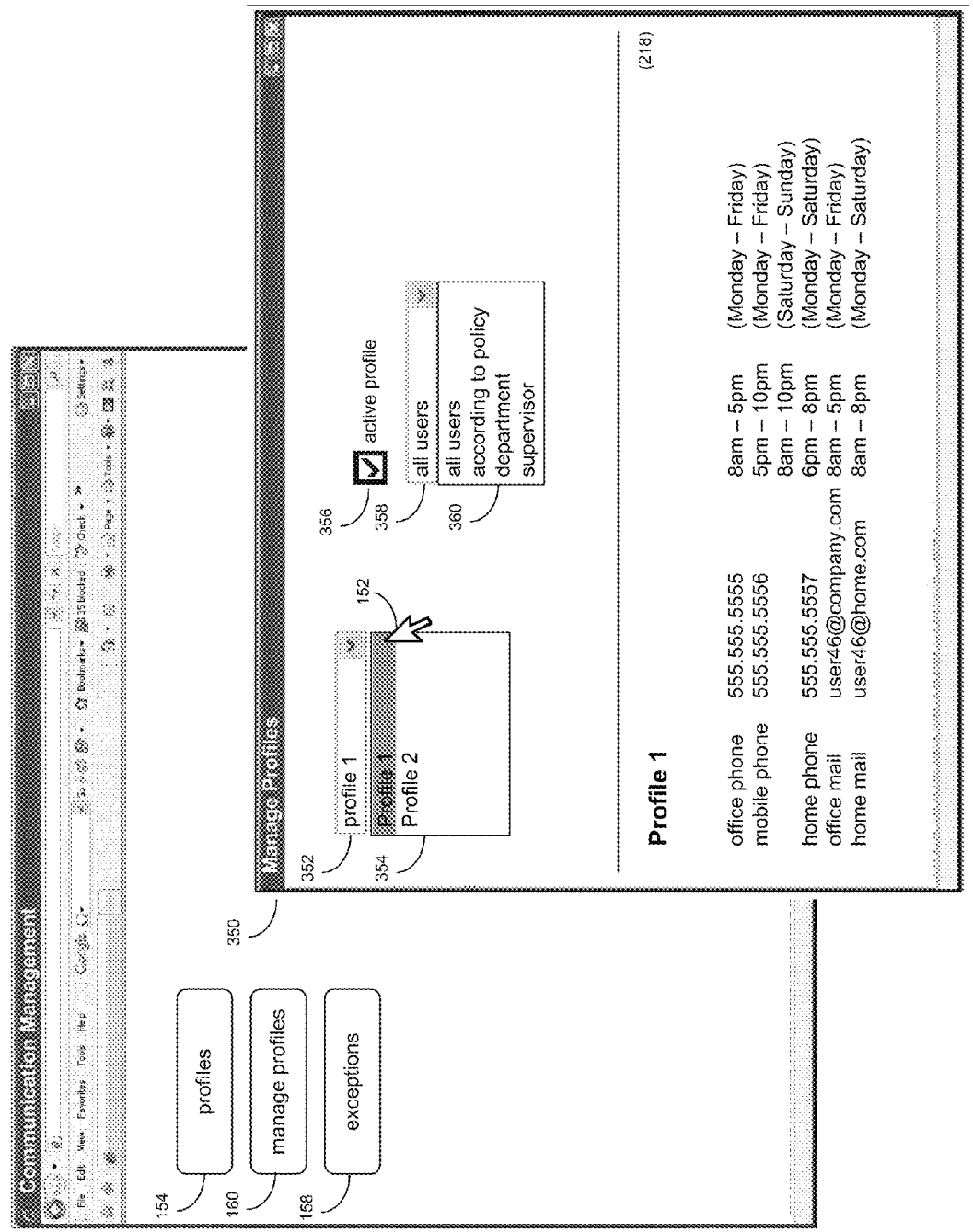
FIG. 9 is a diagrammatic view of a display screen rendered by the communication management process of FIG. 1.

Communication management process 10 may allow a user to manage various defined 100 communication profiles. Continuing with the above stated example, and referring to FIG. 9, communication management process 10 may allow user 46 to manage the various communication profiles through user interface 150. User 46 may select, via on-screen pointer 152, "manage profiles" button 160 resulting in communication management process 10 rendering pop-up window 350. Pop-up window 350 may include profile selection dropdown 352. User 46 may activate profile selection dropdown 352, e.g., by selecting dropdown 352 with on-screen pointer 152, resulting in communication management process 10 rendering profile listing 354. Profile listing 354 may include a listing of communication profiles defined 100 for user 46 (namely "profile 1" and "profile 2", in the illustrated example). User 46 may select the desired communication profile from profile listing 354. Communication management process 10 may display selected communication profile 218 in user interface 150.

In addition to selecting a desired one of the plurality of profiles, the user may define one or more attributes regarding selected profile 218 and/or the implementation of selected communication profile 218. For example, communication management process 10 may allow user 46 to make selected communication profile 218 the active profile, e.g., by selecting "active profile" checkbox 356. Additionally, communication management process 10 may allow user 46 to determine for which contacting users selected communication profile 218 will be the active profile. For example, user 46 may activate dropdown 358 resulting in communication management process 10 rendering listing 360 of users and/or groups of users for which selected communication profile 218 will be the active profile. While listing 360 is shown to include four options, namely "all users", "according to policy", "department", and "supervisor", various other options may be included based upon, at least in part, design decision and desired features. Communication management process 10 may allow user 46 to select (e.g., using on-screen pointer 152) the contacting users for which selected communication profile 218 may be the active profile.

Continuing with the above stated example, in a corresponding manner, user 46 may select one or more of the defined 100 plurality of communication profiles. User 46 may be allowed to make the various other selected communication profiles the active profile for different contacting users and/or groups of contacting users. In this manner, user 46 may be allowed to associate, for example, a first communication profile with one or more first contacting users (e.g., contacting users within user 46's department), a second communication profile with one or more second contacting users (e.g., contacting users having a superior position to user 46 within an organizational hierarchy), and a third communication profile with one or more third contacting users (e.g., contacting users outside of user 46's department).

Additionally/alternatively, communication management process 10 may allow user 46 to activate one or more of the plurality of communication profiles in response to a status and/or input of application 22. For example, application 22 may provide calendaring and scheduling features (e.g., as a calendaring module of an email application). Communication management process 10 may allow user 46 to associate a first communication profile with a "free" status. The "free" status may be a time period in which user 46 is not engaged in a scheduled meeting or event (as indicated by the absence of scheduled events in the calendaring and scheduling application for the relevant time period). Similarly, communication management process 10 may allow user 46 to associate a second communication profile with a "busy" status. The "busy" status may be a time period in which user 46 is engaged in a scheduled meeting or event (as indicated by the presence of scheduled events in the calendaring and scheduling application for the relevant time period).

For example, communication management process 10 may allow user 46 to define 100 a first communication profile in which voice communications are the preferred communication channel. The first communication channel may be associated with a "free" status based upon, at least in part, events scheduled in calendaring and scheduling application 22. Communication management process 10 may also allow user 46 to define 100 a second communication profile in which email is the preferred communication channel. The second communication profile may be associated with a "busy" status based upon, at least in part, events scheduled in calendaring and scheduling application. As such, when user 46 is not engaged in a scheduled meeting or event (i.e., the "free" status) user 46's preferred communication channel may be voice communication. However, when user 46 is engaged in a scheduled meeting or event (i.e., the "busy" status) user 46's preferred communication channel may be email, so as not to be interrupted during the scheduled meeting or event, and/or to accommodate the possibility that user 46 may be unavailable for voice communications (e.g., user 46 may be out of the office).

Communication management process 10 may allow user 46 to define 100 one or more communication profiles including defining 104 one or more communication channels for each communication profiles. Defining 100 one or more communication profiles may also include defining 106 one or more preferred communication schedule for each communication channel of each of the one or more communication profiles. Additionally, user 46 may associate 108 a preferred communication schedule with each respective communication channel for each of the one or more communication profiles.

Continuing with the above-stated example in which user 46 may associate 108 a preferred communication schedule for each of the one or more communication channels of the one or more communication profiles, user 46 may define 106 the one or more preferred communication schedule based upon, at least in part, an event-wise schedule (e.g., in addition/as an alternative to being based upon, at least in part, a time-wise schedule). For example, user 46 may define 106, as a preferred communication schedule, being in the office. For example, user 46 may define 106 being in the office as a preferred communication schedule for voice communications on the office telephone, email communications on a work email account, and instant messaging communications.

Based upon, at least in part, user 46 being in the office, communication management process 10 may set voice communications on an office telephone, email communication on a work email account, and instant messaging as preferred communications channels for user 46. Communication management process 10 may abstract user 46's presence in the office, e.g., from user 46's interactions with application 22. For example, application 22 may be an email client application. Communication management process 10 may abstract user 46's presence in the office based upon, at least in part, the email client application being open. As such, communication management process may set user 46's preferred communications channels accordingly. Communication management process 10 may abstract user 46's presence (or absence) in the office in a variety of other manners, as will be readily understood.

A number of implementations have been described. Nevertheless, it will be understood that various modifications may be made. Accordingly, other implementations are within the scope of the following claims.

What is claimed is:

1. A method comprising:
   defining, by a computer, one or more communication profiles for a user, defining the one or more communication profiles including:
   defining a plurality of communication channels for the user;
   defining a preferred communication schedule for each of the plurality of communication channels, the preferred communication schedule including preferred time periods for receiving communications via each of the plurality of communication channels; and
   associating the preferred communication schedule with a respective one of the plurality of communication channels;
   managing communications with the user from an initiator contacting user based upon, at least in part, the one or more communication profiles for the user; and
   suggesting a recommended communication channel to the initiator contacting user based upon, at least in part, a preferred communication channel of the user for a given day and time, wherein suggesting the recommended communication channel to the initiator contacting user includes providing the preferred time periods for receiving communications each of the plurality of communication channels to the initiator contacting user and providing to the initiator contacting user communication details for each of the plurality of communication channels, wherein the communication details include the contact information to contact the user via each of the plurality of communication channels.

2. The method of claim 1, wherein managing communications with the user includes broadcasting to the initiator contacting user at least a portion of the one or more communication profiles for the user in response to an attempt to contact the user by the initiator contacting user.

3. The method of claim 2, wherein broadcasting to the initiator contacting user at least a portion of the one or more communication profiles for the user includes providing the preferred schedule to the initiator contacting user.

4. The method of claim 2, wherein broadcasting to the initiator contacting user at least a portion of the one or more communication profile for the user includes providing communication details for at least the preferred communication channel.

5. The method of claim 1, wherein managing communications with the user includes enforcing the one or more communication profiles.

6. The method of claim 5, wherein enforcing the one or more communication profiles includes restricting communications to the user on non-preferred channels.

7. The method of claim 5, wherein enforcing the one or more communication profiles includes providing one or more exceptions to the one or more communication profiles based upon, at least in part, a predetermined communications policy.

8. The method of claim 7, wherein the communications policy provides an exception based upon, at least in part, an organizational hierarchy or an identity of the initiator contacting user.

9. The method of claim 1, including defining a plurality of communication profiles.

10. A computer program product residing on a non-transitory computer readable medium having a plurality of instructions stored thereon which, when executed by a processor, cause the processor to perform operations comprising:
    defining one or more communication profiles for a user, defining the one or more communication profiles including:
    defining a plurality of communication channels for the user;
    defining a preferred communication schedule for each of the plurality of communication channels, the preferred communication schedule including preferred time periods for communications via each of the plurality of communication channels; and
    associating the preferred communication schedule with a respective one of the plurality of communication channels;
    managing communications with the user from an initiator contacting user based upon, at least in part, the one or more communication profiles for the user; and
    suggesting a recommended communication channel to the initiator contacting user based upon, at least in part, a preferred communication channel of the user for a given day and time, wherein suggesting the recommended communication channel to the initiator contacting user includes providing the preferred time periods for receiving communications each of the plurality of communication channels to the initiator contacting user and providing to the initiator contacting user communication details for each of the plurality of communication channels, wherein the communication details include the contact information to contact the user via each of the plurality of communication channels.

11. The computer program product of claim 10, wherein the instructions for managing communications with the user include instructions for broadcasting to the initiator contacting user at least a portion of the one or more communication profiles for the user in response to an attempt to contact the user by the initiator contacting user.

12. The computer program product of claim 11, wherein the instructions for broadcasting to the initiator contacting user at least a portion of the one or more communication profiles for the user include instructions for providing the preferred schedule to the initiator contacting user.

13. The computer program product of claim 11, wherein the instructions for broadcasting to the initiator contacting user at least a portion of the one or more communication profile for the user include instructions for providing communication details for at least the preferred communication channel.

14. The computer program product of claim 10, wherein the instructions for managing communications with the user include instructions for enforcing the one or more communication profiles.

15. The computer program product of claim 14, wherein the instructions for enforcing the one or more communication profiles include instructions for restricting communications to the user on non-preferred channels.

16. The computer program product of claim 14, wherein the instructions for enforcing the one or more communication profiles include instructions for providing one or more exceptions to the one or more communication profiles based upon, at least in part, a predetermined communications policy.

17. The computer program product of claim 16, wherein the communications policy provides an exception based upon, at least in part, an organizational hierarchy, or the identity of the contacting user.

18. The computer program product of claim 10, further including instructions for defining a plurality of communication profiles.

19. The method of claim 9, wherein the plurality of communication profiles are for the same user, and wherein at least two of the communication profiles correspond to at least two different initiator contacting users.

20. The computer program product of claim 18, wherein the plurality of communication profiles are for the same user, and wherein at least two of the communication profiles correspond to at least two different initiator contacting users.

* * * * *